US009946428B2

(12) United States Patent
Akolkar et al.

(10) Patent No.: US 9,946,428 B2
(45) Date of Patent: Apr. 17, 2018

(54) MANAGING A WEB-BASED APPLICATION'S DISPLAY

(71) Applicant: International Business Machines Corporation, Armonk, NY (US)

(72) Inventors: Rahul P. Akolkar, Austin, TX (US); Joao P. Goncalves, Wappingers Falls, NY (US); Peter K. Malkin, Ardsley, NY (US); Jacquelyn A. Martino, Cold Spring, NY (US); Mathew S. Thoennes, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 14/597,384

(22) Filed: Jan. 15, 2015

(65) Prior Publication Data

US 2016/0210371 A1    Jul. 21, 2016

(51) Int. Cl.
| | |
|---|---|
| *G06F 3/048* | (2013.01) |
| *G06F 3/01* | (2006.01) |
| *G06F 17/24* | (2006.01) |
| *G06F 3/0484* | (2013.01) |
| *G06F 17/30* | (2006.01) |
| *H04L 29/08* | (2006.01) |

(52) U.S. Cl.
CPC .............. *G06F 3/048* (2013.01); *G06F 3/013* (2013.01); *G06F 3/0484* (2013.01); *G06F 3/04842* (2013.01); *G06F 17/24* (2013.01); *G06F 17/30899* (2013.01); *H04L 67/02* (2013.01)

(58) Field of Classification Search
CPC .... G06F 17/30896; G06F 17/24; G06F 3/013; G06F 3/0481; G06F 3/0484; G06F 3/04842; G06F 3/04886; G06F 21/36; G06F 21/46; G06F 2203/04803; H04L 67/02
USPC ....................................................... 715/234
See application file for complete search history.

(56) References Cited

U.S. PATENT DOCUMENTS

| | | | | |
|---|---|---|---|---|
| 5,339,389 | A  * | 8/1994 | Bates ................... | G06F 3/04812 715/742 |
| 6,278,448 | B1 * | 8/2001 | Brown .................. | G06F 3/0481 715/866 |
| 8,555,155 | B2 * | 10/2013 | Harrison ............. | G06F 17/2247 709/203 |
| 8,885,882 | B1 * | 11/2014 | Yin .......................... | G06F 3/00 382/103 |
| 2002/0116421 | A1 | 8/2002 | Fox et al. | |
| 2004/0027389 | A1* | 2/2004 | Bartek ................. | G06F 9/4443 715/788 |

(Continued)

OTHER PUBLICATIONS

TechSmith, "Snagit Features", obtained via the Internet Archive Wayback Machine from Aug. 24, 2013, https://web.archive.org/web/20130824172047/http://www.techsmith.com/snagit-mac-features.html.*

(Continued)

*Primary Examiner* — Manglesh M Patel
*Assistant Examiner* — Aaron Bennion
(74) *Attorney, Agent, or Firm* — L. Jeffrey Kelly

(57) ABSTRACT

Content of a web-based application is displayed in a window of a web browser application. A selection of the display region is received from a user or a computer implemented system. A locked region is defined based on the selection. When instructions to modify the content of web-based application is received, the instructions are executed except those to modify the locked region.

20 Claims, 10 Drawing Sheets

(56) References Cited

U.S. PATENT DOCUMENTS

| | | | | |
|---|---|---|---|---|
| 2009/0019048 A1* | 1/2009 | Pendergast | G06F 17/30011 | |
| 2011/0283226 A1* | 11/2011 | Basson | G06F 9/4446 | 715/794 |
| 2014/0053065 A1* | 2/2014 | Yun | G06F 17/30905 | 715/238 |
| 2014/0082534 A1* | 3/2014 | Cleron | G06F 3/04883 | 715/764 |
| 2014/0191970 A1* | 7/2014 | Cho | G06F 3/0488 | 345/163 |
| 2014/0282196 A1* | 9/2014 | Zhao | G06F 3/04815 | 715/771 |
| 2014/0298198 A1* | 10/2014 | Kuchibhotla | G06F 17/24 | 715/753 |

OTHER PUBLICATIONS

Phys.org, "Student-developed eye-tracking tablet to help people with disabilities", published Apr. 11, 2011, http://phys.org/news/2011-04-student-developed-eye-tracking-tablet-people-disabilities.html.*

TechSmith, "Snagit Features", obtained via the Internet Archive Wayback Machine as published on Aug. 24, 2013 at https://web.archive.org/web/20130824172047/http://www.techsmith.com/snagit-mac-features.html, pp. 1-3.*

Phys.org, "Student-developed eye-tracking tablet to help people with disabilities", published Apr. 11, 2011 at http://phys.org/news/2011-04-student-developed-eye-tracking-tablet-people-disabilities.html, pp. 1-3.*

Evernote, "Evernote Clearly", http://evernote.com/clearly/, Accessed on Oct. 14, 2014.

Evernote, "How to use Evernote Web Clipper", http://evernote.com/webclipper/guide/, Accessed on Oct. 14, 2014.

* cited by examiner

MANAGING A WEB-BASED APPLICATION'S DISPLAY

FIELD OF INVENTION

The present invention relates generally to the field of computer systems, and more particularly, managing displaying of web-based application content.

BACKGROUND

There are several web-based applications which continually modify their content or manipulate content's display based on various criteria such as displaying of advertising or refreshing the content. Additionally, several web-based applications are available in multiple electronic display platforms; the display is often freely exchangeable between multiple platforms. However, when a display device is changed, its content or display properties may be modified. In both examples, the modifications may interfere with the use and enjoyment of the web-based application.

SUMMARY

Embodiments of the present invention disclose a method, system, and computer program product for preventing various obstructions such as resizing, refreshing, or interfering with the user's view of a certain region of a displayed web-based application.

Embodiments of the present invention provide for locking a user-defined portion of a web-based application based on a user defined criteria. This includes displaying contents generated by a web-based application in a window of a web-browser application, the displayed content corresponding to a first display region including a first set of data objects. A selection of a second display region of the displayed content is received, where the second display region is a subset of the first display region. A third display region of the displayed content is defined based on the second display region. The third display region corresponds to a second set of data objects, which is a subset of the first set of data objects. Instruction(s) to modify one or more data objects, including an instruction to modify a data object in the third display region, is received. The one or more instructions to modify are executed except the instruction to modify a data object in the third display region.

DETAILED DESCRIPTION

Figure 1A:
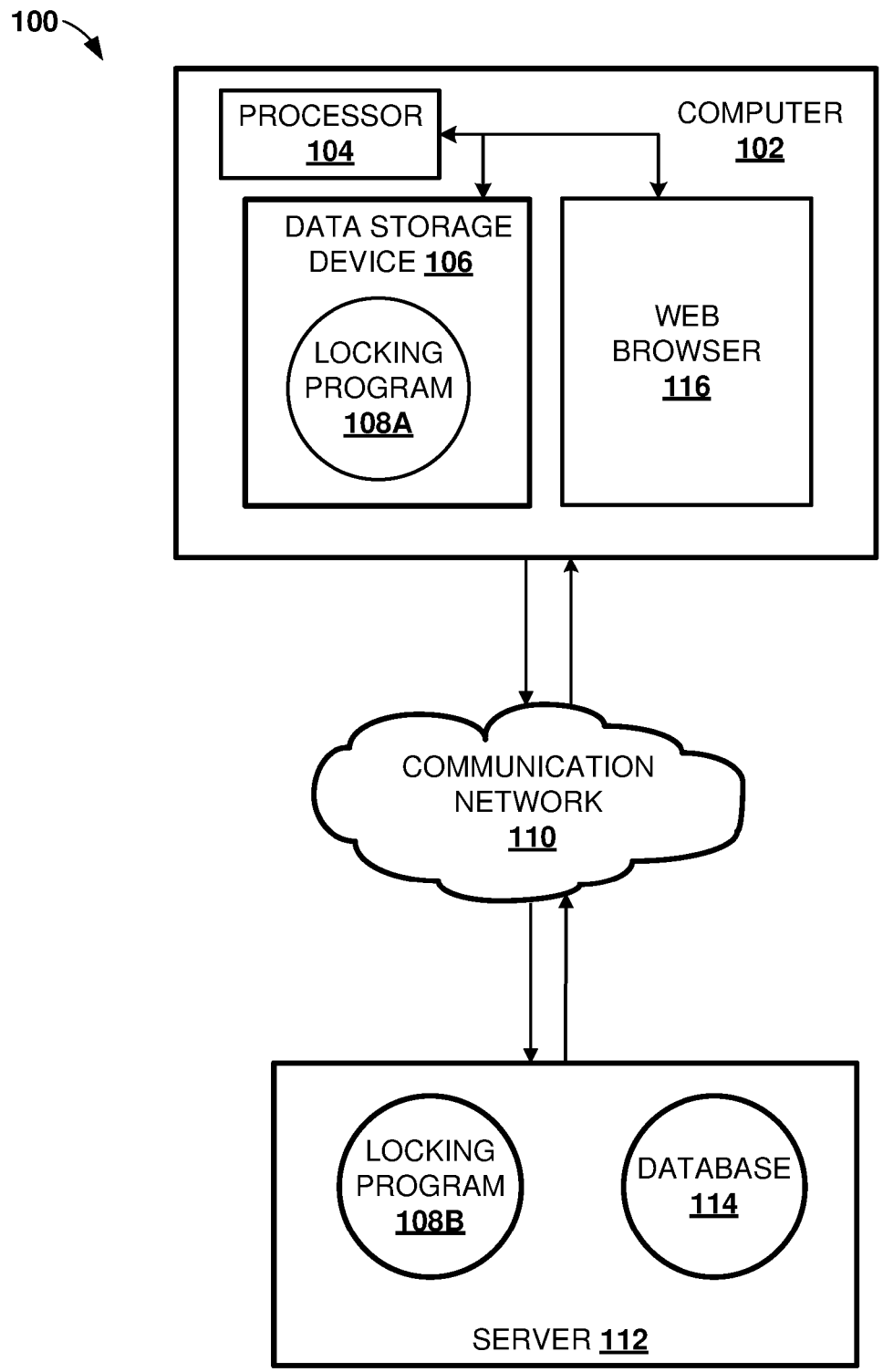
FIGS. 1A-B are schematic block diagrams depicting an exemplary computing environment for a user-defined locked region, according to an aspect of the present invention.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1A is a schematic block diagram depicting an exemplary computing environment 100 for locking a display region within a web-based application. In various embodiments of the present invention the environment 100 includes a computer 102 and server 112 connected over communication network 110.

Computer 102 may include a processor 104 and a data storage device 106 that is enabled to run a Locking Program 108A and a web browser 116 in order to display a web-based application. Non-limiting examples of a web browser may include: Firefox®, Explorer®, or any other web browser. All brand names and/or trademarks used herein are the property of their respective owners.

Networked computer environment 100 may also include a server 112 with a database 114. The server 112 may be enabled to run a Locking Program 108B. Communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication Network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with server 112 via the communication network 110. The communication network 110 may include connections, such as wire, wireless communication links, or fiber optic cables.

Computer 102 and server 112 may be, for example, a mobile device, a telephone, a personal digital assistant, a netbook, a laptop computer, a tablet computer, a desktop computer, or any type of computing device capable of running a program and accessing a network. A program, such as a Locking Program 108A and 108B may run on the client computer 102 or on the server 112.

Figure 1B:
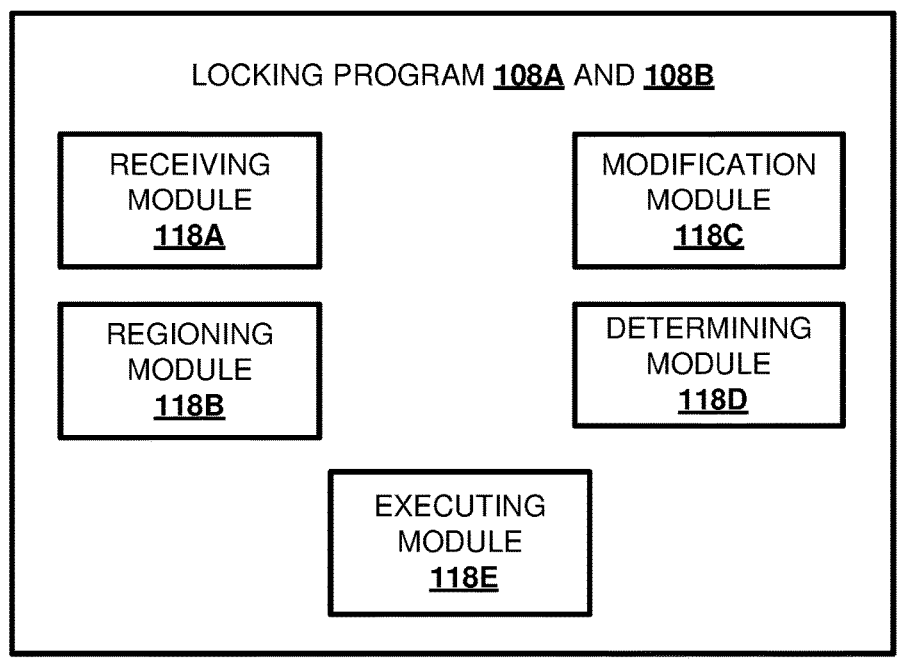

Referring now at FIG. 1B, the components of the Locking Program 108A and 108B, are illustrated. Locking Program 108A and 108B may include a receiving module 118A, regioning module 118B, modification module 118C, determining module 118D, and executing module 118E. The receiving module 118A may receive input from the user regarding the display region which the user would like to lock and a Locking Criteria. The regioning module 118B may identify a display region to be locked based on the input of the user. The modification module 118C may receive an instruction or a set of instructions to modify the content of a display region of a web-based application. The determining module 118D may determine whether the instruction(s) to modify the content of the web-based application also modifies the content of the locked region. Determining module 118D may either communicate the instruction(s) to the executing module 118E or permit the instruction(s) to modify. Executing module 118E may determine whether the Locking Criteria has been satisfied. Executing module 118E may either execute the instruction(s) in their entirety to modify or only execute the instruction(s) to modify the first display region.

Figure 2A:
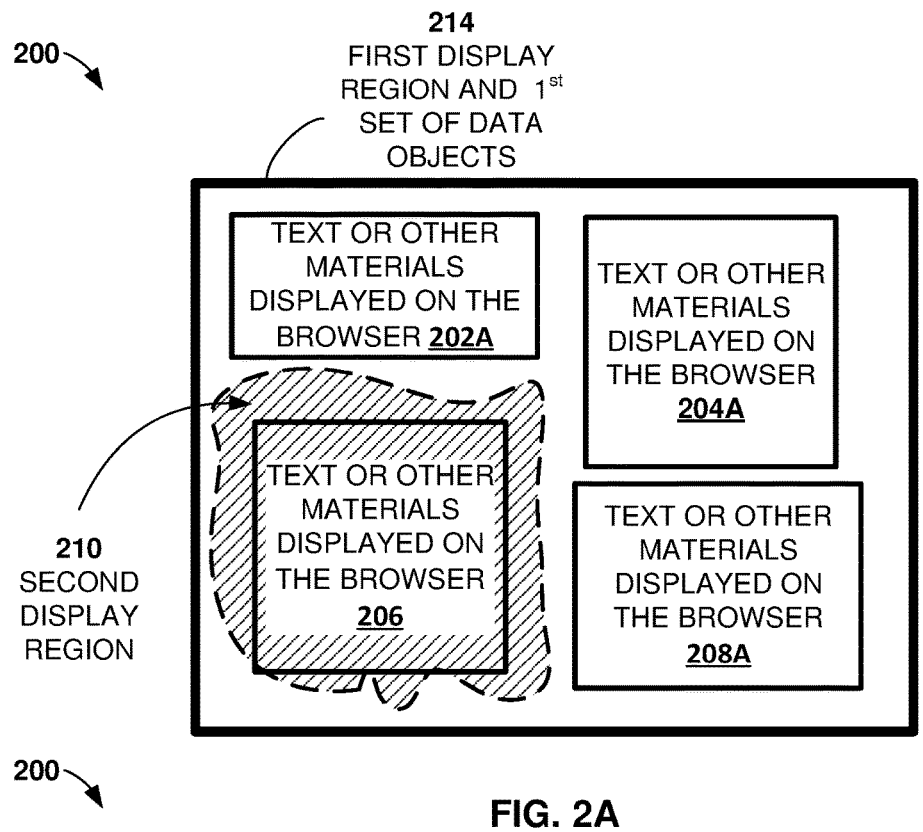
FIGS. 2A-C are schematic block diagrams depicting a timed free-flow shape locked region according to an embodiment of the present invention.
Figure 2B:
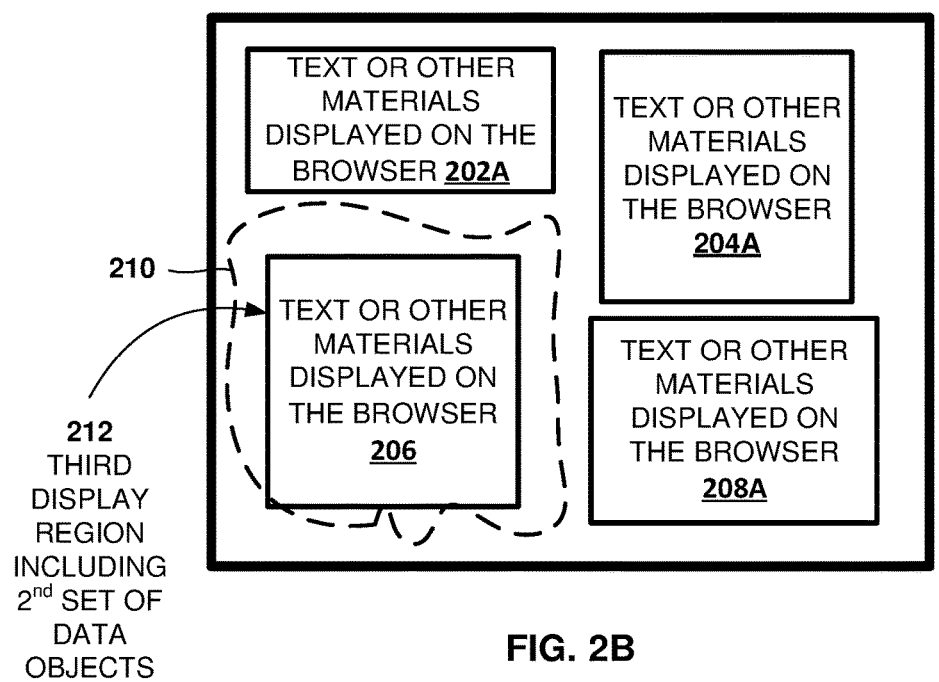
Figure 2C:
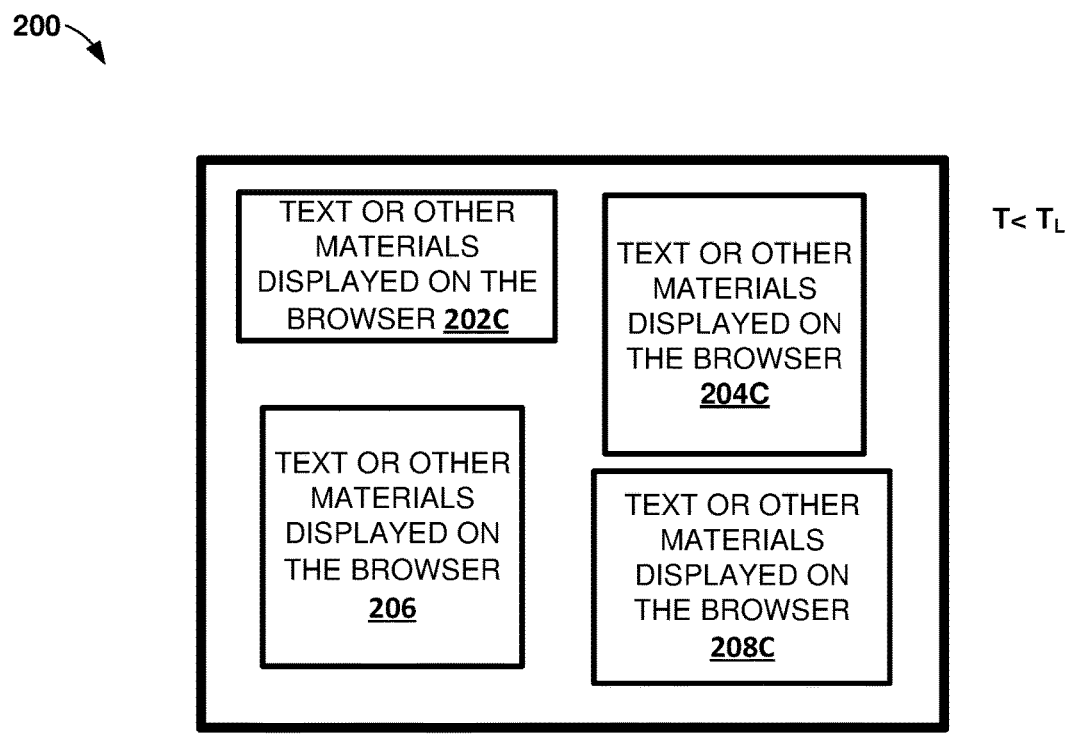

FIGS. 2A-C are schematic block diagrams depicting a free-flow shape user-defined timed locked region according to an embodiment of the present invention. Environment 200 may display the contents of a web-based application, for example a website. According to an embodiment, a user, using the Locking Program 108A or 108B, locks a display region of a website and prevents it from refreshing (or being refreshed).

In reference to FIGS. 1B and 2A, the operation of receiving module 118A is depicted. In the present embodiment, a web browser 116 of a computer system 102 may display the contents of a web-based application. The contents of the web-based application may define a first display region 214, including a first set of data objects. The first set of data objects may include the collection of all the data objects contained within the first display region. In this embodiment, the collection of all the data objects in the first set of data objects shown in FIG. 2A may include data objects 202A, 204A, 206 and 208A. Each of the data objects 202A, 204A, 206 and 208A may include, for example, text, picture, video, instant flash, display coordinates, or any other content normally associated with a web-based application. A user may trace a shape over one or more of the data objects 202A, 204A, 206 and 208A, using an input device, for example, mouse, stylus or any other input method in order to indicate a second display region 210. In the present embodiment, the shape of the second display region 210 may include a perimeter having a geometrically-irregular and a free-flowing shape positioned over the data object 206. It should be noted that the second display region 210 may be positioned over any of the collection of all the data objects in the first set of data objects of FIG. 2A, including, for example, data objects 202A, 204A, and 208A.

In various embodiments, receiving module 118A may receive a Locking Criteria, for example from a user. A Locking Criteria may be a condition or set of conditions to start or stop the Locking Program 108A and 108B. Locking Criteria may be user defined or defined by another computer implemented system. Furthermore, Locking Criteria may be predetermined or generated as a result of the user's direct intervention. In the present embodiment the Locking Criteria is defined as a time duration $T_L$, whereby after the expiration of $T_L$ the Locking Program 108A and 108B, may no longer prevent instruction(s) to modify the locked region.

In reference to FIG. 2B, operation of regioning module 118B is depicted. Regioning module 118B determines a third display region 212 based on the second display region 210, as defined based on input received from the user. The third display region 212 may include at least a portion of the second display region 210. The third display region 212 includes a second set of data objects which is a subset of the first set of data objects shown in FIG. 2A, this subset of data objects includes data object 206 as shown in FIG. 2B. The operation of the regioning module 118B results in Locking Program 108A and 108B defining a third display region 212.

In reference to FIG. 2C, the operation of modification module 118C, determining module 118D, and executing module 118E is depicted. Modification module 118C receives an instruction or a set of instructions to modify either the first set of data objects, or the second set of data objects or both. These modifications may be, among other things, user-defined or defined by another computer implemented system. The instruction may be, for example, an instruction to refresh the content of the web-based application or to resize the web page in order to display a new layer of advertisement. Modification module 118C may communicate these modifications to the determining module 118D. If the determining module 118D receives an instruction, or a set of instructions, to modify the first set of data objects or the second set of data objects including the selected data object 206, it may determine whether the instruction(s) modify the data object 206 (which is located in the region selected to be locked as described in FIG. 2C). If the determining module 118D concludes that the instruction(s) do not modify the data object 206, determining module 118D may continue to receive and execute the instruction(s); however, if determining module 118D concludes that the instruction(s) do modify the data object 206, determining module 118D communicates the modification(s) to the executing module 118E. Executing module 118E determines whether the Locking Criteria has been satisfied. If the executing module 118E concludes that the Locking Criteria has not been satisfied, executing module 118E permits only modifications that do not affect the data object 206. If executing module 118E concludes that the Locking Criteria has been satisfied, the Locking Program 108A and 108B executes all modifying instruction(s).

In reference to FIG. 2C, regioning module 118B may determine a locked region, and determining module 118D may receive an instruction to refresh a website's display and determines that the instructions do modify the data object 206. Executing module 118E may determine that the Locking Criteria $T_L$ has not been satisfied (where $T<T_L$) and may permit data objects 202A, 204A, and 208A (FIG. 2B) to be refreshed. After refreshing, the content of the data objects 202A, 204A, and 208A may be modified into data objects 202C, 204C, and 208C respectively. However, contents of the third display region 210 (FIG. 2B), including the data object 206, may remain unchanged.

FIGS. 3A-D are schematic block diagrams depicting a regular shaped user-defined timed locked region according to an embodiment of the present invention. Environment 300 illustrates a display of contents of a web-based application, in this embodiment a website, on a computer screen. According to the present embodiment, a display region of a website is locked when the website is refreshed and after the time criteria is satisfied, the locked display region is freely refreshed.

Figure 3A:
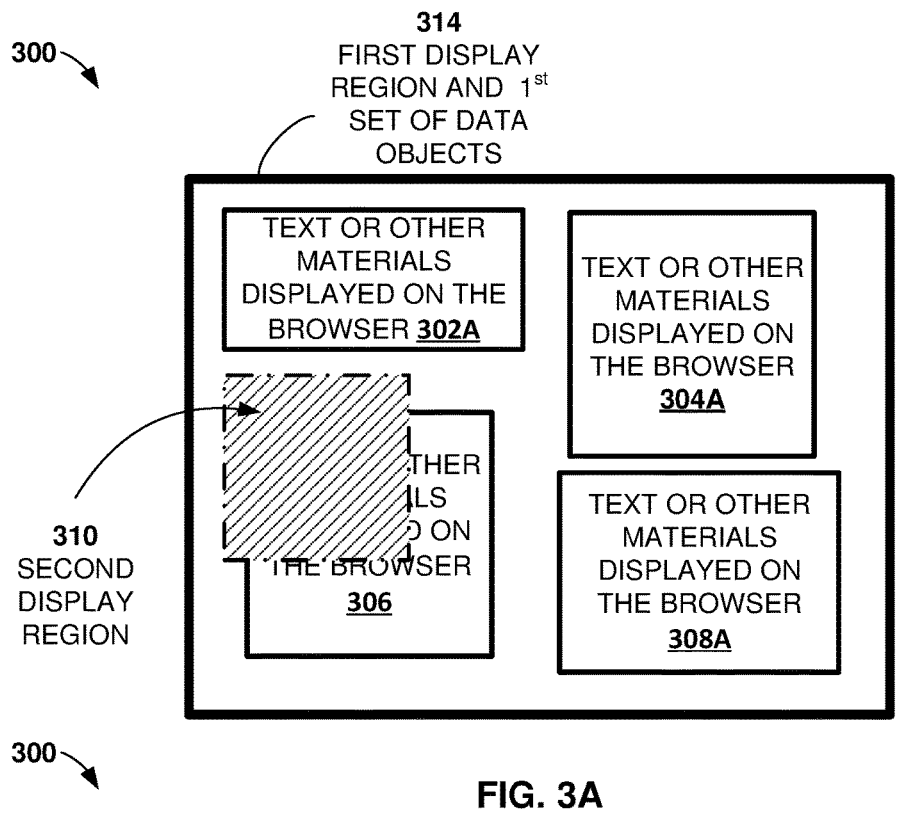
FIGS. 3A-D are schematic block diagrams depicting a timed geometrically-regular shape locked region according to an embodiment of the present invention.

In reference to FIGS. 1B and 3A, the operation of receiving module 118A is depicted. In the present embodiment, a web browser 116 of a computer system 102 displays contents of a web-based application. The contents of the web-based application define a first display region 314, and include a first set of data objects. The first set of data objects may include the collection of all the data objects contained within the first display region. In this embodiment, the collection of all the data objects in the first set of data objects shown in FIG. 3A may include data objects 302A, 304A, 306 and 308A. Each of the data objects 302A, 304A, 306 and 308A may include, in the present embodiment, text, picture, video, instant flash, display coordinates, or any other content normally associated with a web-based application. A user may trace a shape over one or more of the data objects 302A, 304A, 306 and 308A, using an input device, for example, mouse, stylus or any other input device, around the perimeter of an area which the user desires to lock in order to indicate a second display region 310 (region to be locked). In the present embodiment, the shaped is traced over the data object 306 and the perimeter may be a geometrically-regular and free-flowing shape. It should be noted that the second display region 310 may be positioned over any of the collection of all the data objects in the first set of data objects of FIG. 3A, including, for example, data objects 302A, 304A, and 308A.

Receiving module 118A, in the present embodiment, may also receive a Locking Criteria. A Locking Criteria may be a condition or set of conditions to start or stop the Locking Program 108A and 108B. Locking Criteria may be user defined or defined by another computer implemented system. Furthermore, Locking Criteria may be predetermined or generated as a result of the user's direct intervention. In the present embodiment the Locking Criteria is defined as a time duration $T_L$, whereby after the expiration of $T_L$ the Locking Program 108A and 108B, no longer prevents instruction(s) to modify the locked region.

Figure 3B:
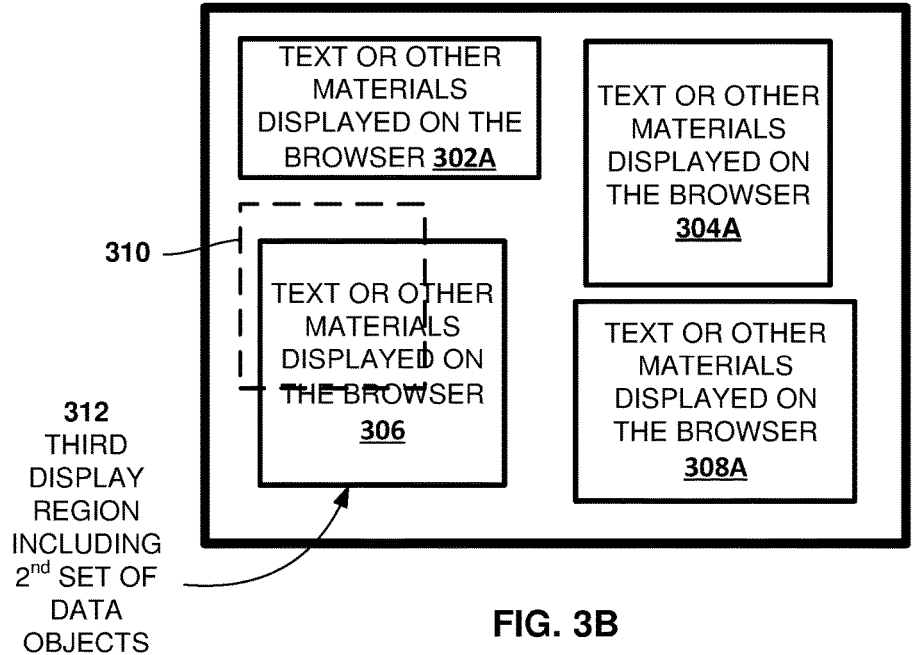

In reference to FIG. 3B, operation of regioning module 118B is depicted. Regioning module 118B determines a third display region 312 based on the second display region 310, as defined based on input received from the user. The third display region 312 may include at least a portion of the second display region 310. The third display region 312 defines a region to be locked which, in this embodiment, includes data object 306. The operation of the regioning module 118B results in Locking program 108A and 108B defining the third display region 312 (locked region). In the present embodiment, third display region 312 encompasses the entire data object 306 even though the second display region 310 did not include the entire region.

Figure 3C:
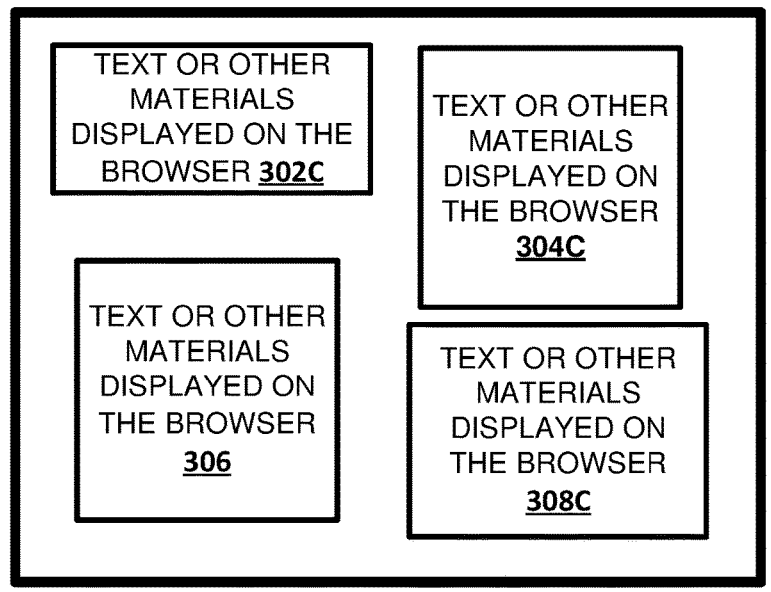

In reference to FIG. 3C, the operation of modification module 118C, determining module 118D, and executing module 118E is depicted. Modification module 118C receives an instruction or a set of instructions to modify either the first set of data objects, or the second set of data objects or both. These modification may be, among other things, user-defined or defined by another computer implemented system. The instruction could be, for example, an instruction to refresh the content of the web-based application or to resize the web page in order to display a new layer of advertisement. Modification module 118C communicates these modifications to the determining module 118D. If the determining module 118D receives an instruction, or a set of instructions, to modify the first set of data objects or the second set of data objects including the selected data object 306, it determines whether the instruction(s) modify the data object 306. If the determining module 118D concludes that the instruction(s) do not modify the data object 306, determining module 118D continues to receive and execute the instruction(s); however, if determining module 118D concludes that the instruction(s) do modify the data object 306, determining module 118D communicates the instruction(s) to the executing module 118E. Executing module 118E determines whether the Locking Criteria has been satisfied. If the executing module 118E concludes that the Locking Criteria has not been satisfied, executing module 118E permits only modifications that do not affect the data object 306. If executing module 118E concludes that the Locking Criteria has been satisfied, the locking program 108A and 108B executes all modifying instructions.

In the present embodiment, an instruction to refresh the first display region 314 is received by the determining module 118D and it is determined by the determining module 118D that refreshing the first display region 314 modifies the third display region 312 (corresponding to the data object 306). Executing module 118E determines that the Locking Criteria $T_L$ has not been satisfied ($T<T_L$) and permits data objects 302A, 304A, and 308A to be refreshed.

Consequently the content of these data objects of the first display region 312 are modified into 302C, 304C, and 308C respectively, after refreshing. However, the content of the third display region 312, including data object 306, remains the same.

Figure 3D:
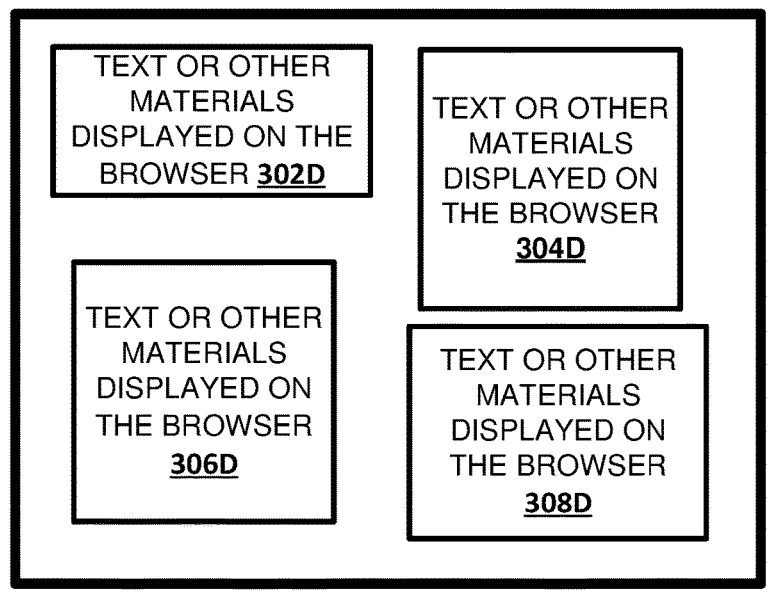

In reference to FIG. 3D operation of the executing module 118E, after the satisfaction of the Locking Criteria, is depicted. In the present embodiment, executing module 118E receives an instruction to modify the first set of data objects and the second set of data objects. Executing module 118E determines that the Locking Criteria has been satisfied ($T>T_L$). Executing module 118E consequently permits the instruction to modify the first set of data objects and the second set of data objects. More specifically, after the Locking Criteria has been satisfied, the executing module 118E allows the modification of the previously locked data object 306 and permits data objects 302C, 304C, and 308C to be modified. Consequently, the content of these regions are modified into 302D, 304D, 308D and 306D respectively.

FIG. 4A-D are schematic block diagrams depicting a free-flow shape user-defined locked region with a user-defined Locking Criteria to start the locking process, according to an embodiment of the present invention. Environment 400 illustrates a display of contents of a web-based application, in this embodiment a website, on a computer screen. According to the present embodiment, a region of a website is locked when a computer implemented program attempts to display an advertising layer which interferes with a user-defined locked region.

Figure 4A:
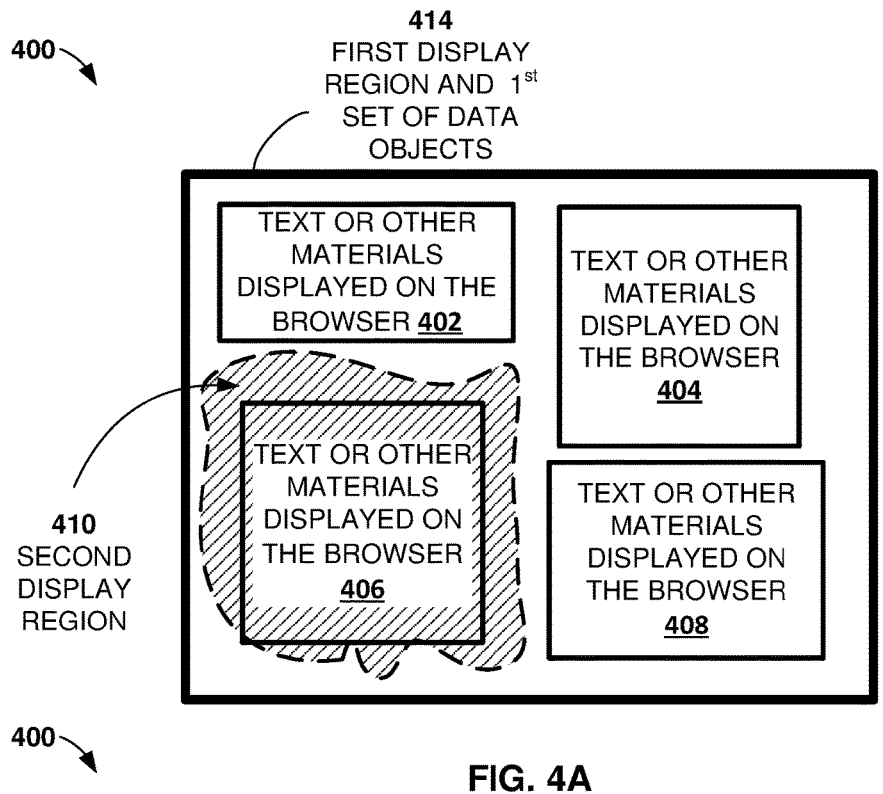
FIG. 4A-D are schematic block diagrams depicting a free-flow shape user-defined locked region with a user-defined Locking Criteria to start the locking process, according to an embodiment of the present invention.

In reference to FIGS. 1B and 4A, the operation of receiving module 118A is depicted. In the present embodiment, a web browser 116 of a computer system 102 displays contents of a web-based application. The contents of the web-based application define a first display region 414, and include a first set of data objects. The first set of data objects may include the collection of all the data objects contained within the first display region. In this embodiment, the collection of all the data objects in the first set of data objects shown in FIG. 4A may include data objects 402, 404, 406 and 408. Each of the data objects 402, 404, 406 and 408 may include, in the present embodiment, text, picture, video, instant flash, display coordinates, or any other content normally associated with a web-based application. A user may trace a shape over one or more of the data objects 402, 404, 406 and 408, using an input device, for example, mouse, stylus or any other input device, around the perimeter of an area which the user desires to lock in order to indicate a second display region 410. In the present embodiment, the perimeter may be a geometrically-irregular and a free-flowing shape drawn over data object 306. It should be noted that the second display region 410 may be positioned over any of the collection of all the data objects in the first set of data objects of FIG. 4A, including, for example, data objects 402, 404, and 408.

Receiving module 118A, in the present embodiment, may also receive a Locking Criteria. A Locking Criteria may be a condition or set of conditions to start or stop the Locking Program 108A and 108B. Locking Criteria may be user defined or defined by another computer implemented system. Furthermore, Locking Criteria may be predetermined or generated as a result of the user's direct intervention. In the present embodiment the Locking Criteria is defined by the user as "not having any interference with the display of the locked region".

Figure 4B:
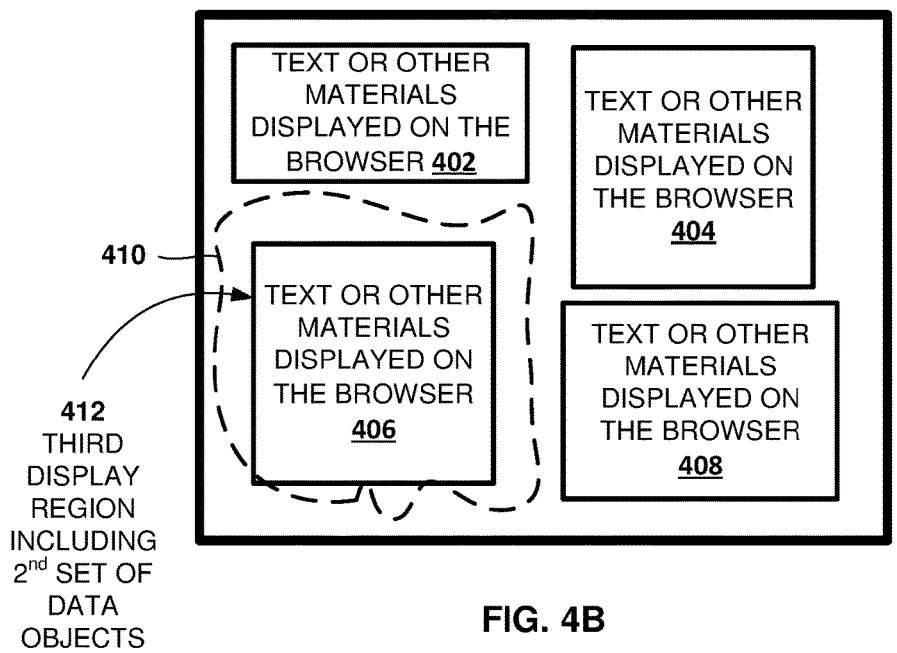

In reference to FIG. 4B, operation of regioning module 118B is depicted. Regioning module 118B determines a third display region 412 based on the second display region 410, as defined based on input received from the user. The third display region 412 may include at least a portion of the second display region 410. The third display region 412 includes the data object 406. The operation of the regioning module 118B results in Locking Program 108A and 108B defining the third display region 412.

Figure 4C:
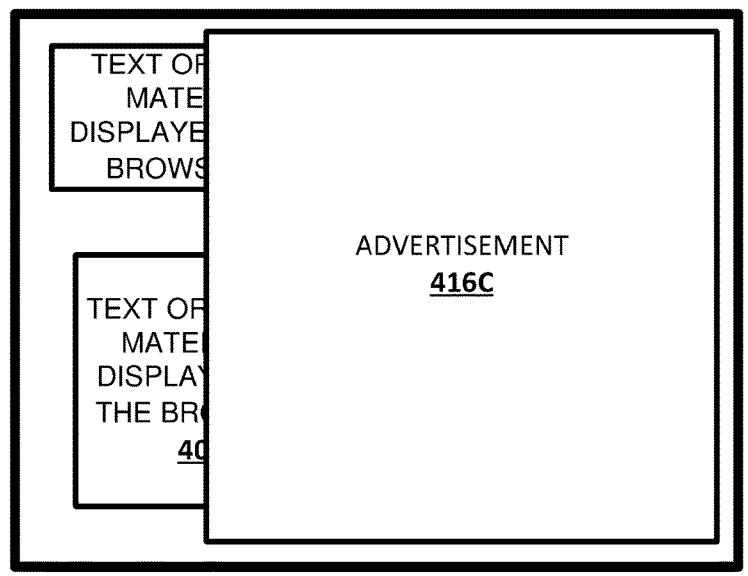

In reference to FIG. 4C, the operation of modification module 118C, determining module 118D, and executing module 118E is depicted. Modification module 118C receives an instruction or a set of instructions to modify either first set of data objects, or the second set of data objects or both. These modifications may be, among other things, user-defined or defined by another computer implemented system. The instruction could be, for example, an instruction to refresh the content of the web-based application or to resize the web page in order to display a new layer of advertisement. Modification module 118C communicates these modifications to the determining module 118D. If the determining module 118D receives an instruction, or a set of instructions, to modify the first set of data objects or the second set of data objects, it determines whether the instruction(s) modify the selected data object 406. If the determining module 118D concludes that the instruction(s) do not modify the data object 406, determining module 118D continues to receive and execute the instruction(s); however, if determining module 118D concludes that the instruction(s) do modify the data object 406, determining module 118D communicates the instruction(s) to the executing module 118E. Executing module 118E determines whether the Locking Criteria has been satisfied. If the executing module 118E concludes that the Locking Criteria has not been satisfied, executing module 118E permits only modifications that do not affect the data object 406. If executing module 118E concludes that the Locking Criteria has been satisfied, the locking program 108A and 108B executes all modifying instructions.

Figure 4D:
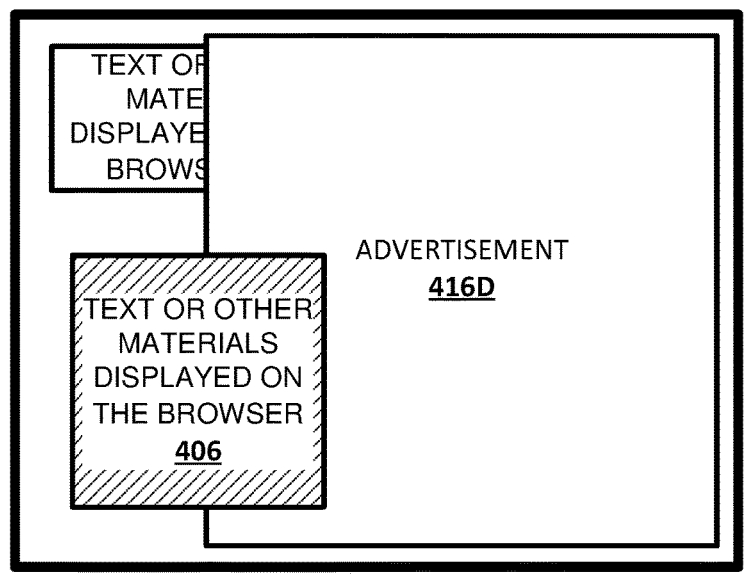

In the present embodiment, an instruction to display a layer of advertising 416C is received by the modification module 118C. Determining module 118D determines that advertising 416C modifies the third display region 412 including the data object 406 and therefore communicates the modification to executing module 118E. Executing module 118E determines that the Locking Criteria ("not having any interference with the display of the locked region") has not been satisfied and consequently permits only the display of the advertisement which doesn't interfere with the third display region 412. Consequently the third display region 412 remains the same and advertisement 416C is modified to 416D as shown in FIG. 4D.

Figure 5:
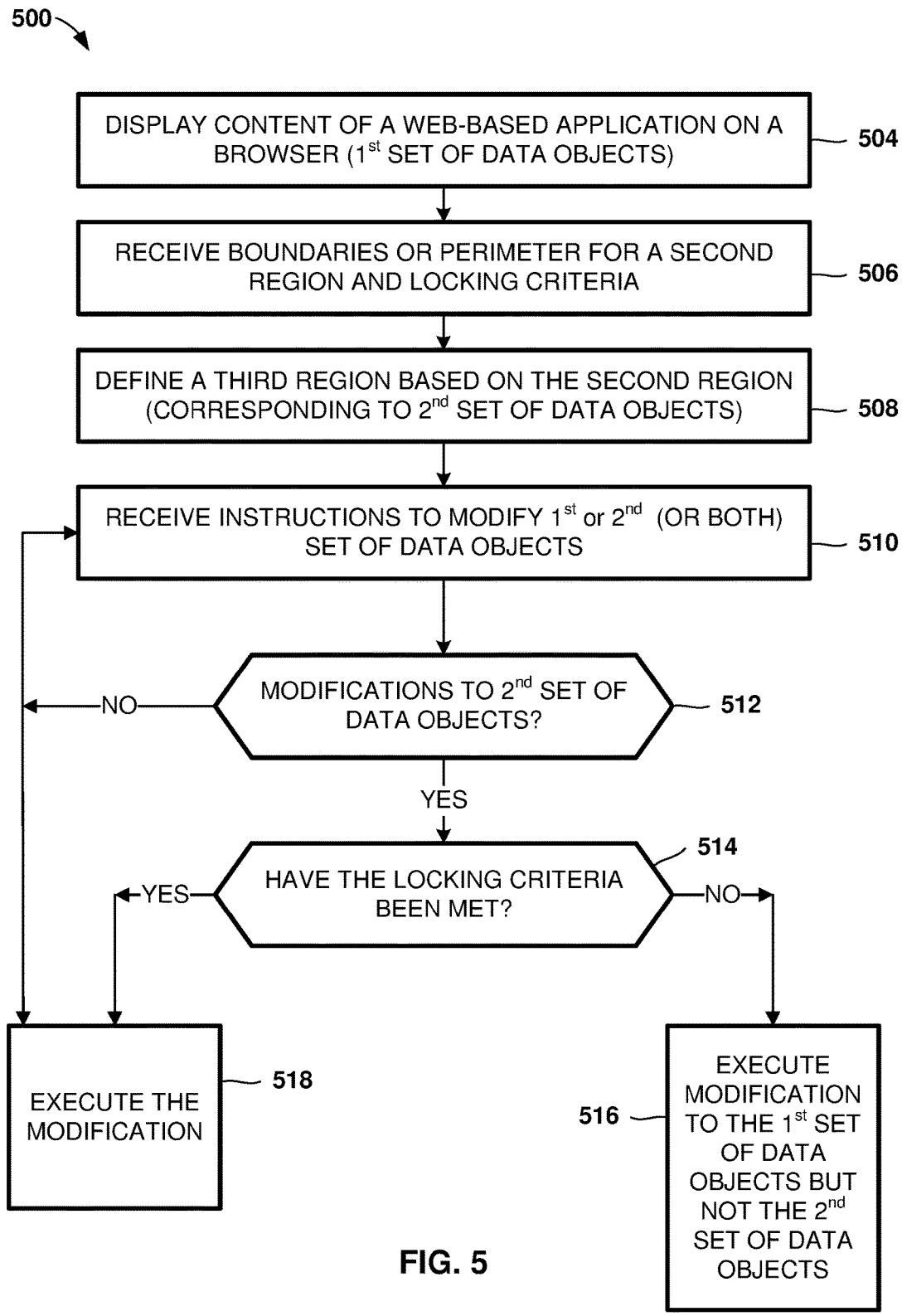
FIG. 5 is a flowchart depicting operational steps of a computer implemented method for defining a user-identified locked display region, according to an aspect of the present invention.

FIG. 5 is a flowchart depicting operational steps of a computer implemented method for a user-identified locked display region, according to an aspect of the present invention. Steps of method 500 may be implemented using one or more modules of a computer program, for example, Locking Program 108A, and executed by a processor of a computer, such as computer 102.

Referring now to FIGS. 1A-B, 2, 3, 4 and 5, at step 504, web browser 116 displays contents of a web-based application, such as a webpage on computer 102. Contents of the web-based application define a first display region, and include a first set of data objects. The first set of data objects may include the collection of all the data objects contained within the first display region and may include, in the present embodiment, text, picture, video, instant flash, display coordinates, or any other content normally associated with a web-based application as illustrated in 202A, 204A, 208A, and 206.

At step 506, receiving module 118A, receives boundaries or a perimeter of a second display region 210. The second display region 210 may represent the display region which the user desires to lock, in part or in its entirety. According to an embodiment of present invention, a user may interact with an electronic input source to select a second display region of the web-based application. The user selects a geometrically-regular shape (e.g. square, triangle . . . ) or a free flow shape, for example, irregular geometric shape. The user may select the second display region 210 using a mouse or a stylus and tracing around the display region.

At step 508, receiving module 118A, also receives a Locking Criteria. Locking Criteria represents a condition or set of conditions which the user desires to start or end the locking process. Locking Criteria maybe directly input by a user or by a computer implemented system. Non-limiting examples include: user inputs a condition such as setting a specific time for a display region to be locked (FIGS. 2A-C and 3A-D); user interventions such as locking a display region until the user directly inputs the command to unlock the display region.

An example of a user-defined Locking Criteria input from a computer implemented system may occur when a user desires to lock a display region if the user is looking at that display region. This may occur with displays on multiple monitors. In this embodiment, user may set "looking at the screen" as a Locking Criteria and an electronic device (i.e. a camera) may detect and monitor user's eye or head movements; receiving module 118A may receive an indication from the camera that the user is looking at (or has turn his or her head towards) a monitor and Locking Program 108A and B, may lock the content displayed on the monitor (see below).

At step 508, regioning module 118B determines a third display region 312. Using FIGS. 3A-B as an example, the operation of this module is depicted. The third display region 312 corresponds to a second set of data objects 306 which is a subset of the first set of data objects. The determination, by the regioning module 118B, of a third display region 312 has been implemented in order to correct an inadvertent error by the user to identify the locked region. The third display region 312 includes at least part of the first display region 314 and the second display region 310.

At step 510, modification module 118C receives an instruction or a set of instructions to modify either first set of data objects, or the second set of data object 206 or both. For example, by refreshing the content of the web-based application or resizing the web page in order to display a new layer of advertisement, first or second sets of data objects (or both) could be modified. In another embodiment, modification module 118C may communicate and alert (a message informing the user) that an instruction or set of instructions are attempting to modify the first set of data objects or the second set of data objects 206 or both.

At step 512, if determining module 118D determines the second set of data objects 206 is affected by the modification (decision step 512 "YES" branch) determining module 118D communicates modifications are occurring to executing module 118E. If determining module 118D determines the second set of data objects 206 is not affected by the modification (decision step 512 "NO" branch) determining module 118D continues to receive instruction or a set of instructions to modify the first set of data objects or the second set of data objects 206 or both, permit the modification, and does not communicate modifications with executing module 118E (step 518).

At step 514, executing module 118E receives a communication from determining module 118D that modifications occurred to the second set of data objects 206. If executing module 118E determines the Locking Criteria is satisfied (decision step 514 "YES" branch) executing module 118E permits the modification. If executing module 118E determines the Locking Criteria is not satisfied (decision step 514 "NO" branch) executing module 118E permits only the modification which alter the first set of data objects in the first region and second region; however, the second set of data objects of the third region remain unchanged. In various embodiments, when the displayed content of a web browser 116 is refreshed, after establishing a third display region 212, and the content is determined to be modified, executing module 118E only permits the change to the text which is not located within the third display region 212 or is not included within the second set of data objects 206 (step 516).

Figure 6:
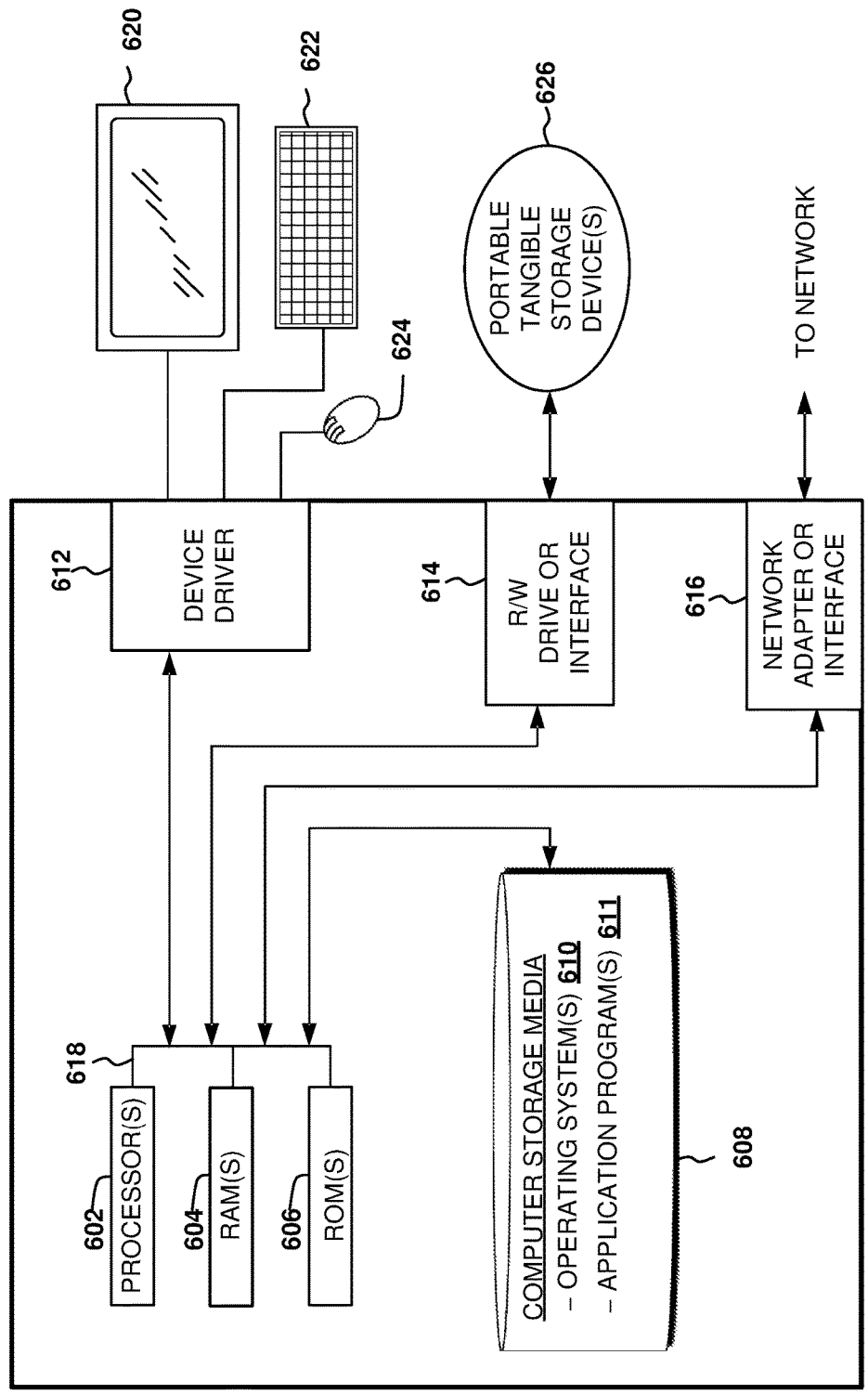
FIG. 6 is a block diagram of internal and external components of computers and servers depicted in FIG. 1 according to an embodiment of the present invention.

FIG. 6 depicts a block diagram of components a computer system, for example server 112 and computer 102, of distributed data processing environment 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Server 112 and computer 102 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, server applications (not shown) may be stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 614 to read from and write to one or more portable computer readable storage media 626. Application programs 611 on server 112 and computer 102 may be stored on one or more of the portable computer readable storage media 626, read via the respective R/W drive or interface 614 and loaded into the respective computer readable storage media 608.

Server 112 may also include a network adapter or interface 616, such as a TCP/IP adapter card or wireless communication adapter (such as a 4G wireless communication adapter using OFDMA technology). Application programs 611 on server 112 and may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Server 112 and computer 102 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for managing displaying of webpage content on a web browser application, the method comprising:

displaying content generated by a web-based application in a window of a web-browser application, the displayed content corresponding to a first display region and comprising a set of displayed data objects;

receiving a selection of a second display region of the displayed content from a user via an electronic input source, wherein the second display region is a subset of the first display region;

in response to the selection, defining a third display region of the displayed content within the second display region, the third display region comprising at least one displayed data object from the set of displayed data objects, wherein the at least one displayed data object comprises a text, a picture, a video, an instant flash, or display coordinates of interest to the user, and wherein the first display region, the second display region, and the third display region comprise different areas of the webpage;

in response to the selection, initiating a locking criteria, wherein the locking criteria ensures content of the at least one displayed data object in the third display region remains locked and unmodifiable, and wherein the locking criteria is maintained during a period when time elapsed since the initiation of the locking criteria is less than a finite time duration;

receiving one or more instructions to modify one or more displayed data objects in the set of displayed data objects including an instruction to modify the at least one displayed data object in the third display region;

notifying the user of the received one or more instructions to modify the one or more displayed data objects including the at least one displayed data object in the third display region; and in response to the one or more instructions being received during a time when the locking criteria is maintained, executing the one or more instructions to modify the one or more displayed data objects except the instruction to modify the at least one displayed data object in the third display region;

wherein one or more steps of the method are performed by one or more computer processors.

2. The method of claim 1, further comprising: in response to the one or more instructions being received after an expiration of the time of the locking criteria, wherein the locking criteria is expired upon the time elapsed since initiation is greater the finite time duration, executing the one or more instructions to modify the one or more displayed data objects in the set of displayed data objects including the instruction to modify the at least one displayed data object in the third display region.

3. The method of claim 1, wherein receiving a selection of the second display region comprises receiving user-defined boundaries.

4. The method of claim 3, wherein the user-defined boundaries correspond to one or more of:
a geometrically-regular shape having boundaries defined by the user; and
a geometrically-irregular shape having a perimeter defined by the user.

5. The method of claim 1, wherein receiving the selection of the second display region comprises:
receiving an electronic input corresponding to a user's eye movement; and
identifying the third display region based on the user's eye movement.

6. A computer system for managing displaying of webpage content on a web browser application, the computer system comprising:
one or more computer processors;
one or more computer-readable storage media;
program instructions stored on the computer-readable storage media for execution by at least one of the one or more processors, the program instructions comprising:
instructions to display content generated by a web-based application in a window of a web browser application, the displayed content corresponding to a first display region and comprising a set of displayed data objects;
instructions to receive a selection of a second display region of a displayed content from a user via an electronic input source, wherein a second display region is a subset of a first display region;
instructions, in response to the selection, to define a third display region of the displayed content within the second display region, the third display region comprising at least one displayed data object from the set of displayed data objects, wherein the at least one displayed data object comprises a text, a picture, a video, an instant flash, or display coordinates of interest to the user and wherein the first display region, the second display region, and the third display region comprise different areas of the webpage;
instructions to initiate in response to the selection, a locking criteria, wherein the locking criteria ensures content of the at least one displayed data object in the third display region remains locked and unmodifiable, and wherein the locking criteria is maintained during a period when time elapsed since the initiation of the locking criteria is less than a finite time duration;
instructions to receive one or more instructions to modify one or more displayed data objects in the set of displayed data objects including an instruction to modify the at least one displayed data object in the third display region;
instructions to notify the user of the received one or more instructions attempting to modify the one or more displayed data objects including the at least one displayed data object in the third display region; and
in response to the one or more instructions being received during a time when the locking criteria is maintained, instructions to execute the one or more instructions to modify the one or more displayed data objects except an instruction to modify the at least one displayed data object in the third display region.

7. The method of claim 6, further comprising:
in response to the one or more instructions being received after an expiration of the time of the locking criteria, wherein the locking criteria is expired upon the time elapsed since initiation is greater the finite time duration, executing the one or more instructions to modify the one or more displayed data objects in the set of displayed data objects including the instruction to modify the at least one displayed data object in the third display region.

8. The computer system of claim 6, wherein instructions to receive a selection of the second display region comprises instructions to receive user-defined boundaries.

9. The computer system of claim 8, wherein the user-defined boundaries correspond to one or more of:
a geometrically-regular shape having boundaries defined by the user; and
a geometrically-irregular shape having a perimeter defined by the user.

10. The computer system of claim 6, wherein instructions to receive the selection of the second display region comprise:
instructions to receive an electronic input corresponding to a user's eye movement; and
instructions to identify the second display region based on the user's eye movement.

11. A computer program product for managing displaying of webpage content of a web browser application, comprising a tangible storage media having program instructions embodied therewith, the program code executable by a processor of a computer to perform a method, the program instructions comprising:
instructions to display, by the processor, content generated by a web-based application in a window of a web-browser application, the displayed content corresponding to a first display region and comprising a set of displayed data objects;
instructions to receive, by the processor, a selection of a second display region of a displayed content from a user via an electronic input source, wherein the second display region is a subset of a first display region;
instructions to define, by the processor, in response to the selection, a third display region of the displayed content within the second display region, the third display region comprising at least one displayed data object from the set of displayed data objects, wherein the at least one displayed data object comprises a text, a picture, a video, an instant flash, or display coordinates of interest to the user and wherein the first display region, the second display region, and the third display region comprise different areas of the web page;
instructions to initiate by the processor, in response to the selection, a locking criteria, wherein the locking criteria ensures content of the at least one displayed data object in the third display region remains locked and unmodifiable, and wherein the locking criteria is maintained during a period when time elapsed since the initiation of the locking criteria is less than a finite time duration;
instructions to receive, by the processor, one or more instructions to modify one or more displayed data objects in the set of displayed data objects including an instruction to modify the at least one displayed data object in the third display region;

instruction to notify the user, by the processor, of the received one or more instructions attempting to modify the one or more displayed data objects including the at least one displayed data object in the third display region; and in response to the one or more instructions being received during a time when the locking criteria is maintained, instructions to execute, by the processor, the one or more instructions to modify the one or more displayed data objects except an instruction to modify the at least one displayed data object in the third display region.

12. The computer program product of claim 11, further comprising:

in response to the one or more instructions being received after expiration of the locking criteria wherein the locking criteria is expired upon the time elapsed since initiation is greater the finite time duration, instructions to execute, by the processor, the one or more instructions to modify the one or more displayed data objects in the set of displayed data objects including the instruction to modify the at least one displayed data object in the third display region.

13. The computer program product of claim 11, wherein receiving, by the processor, a selection of the second display region comprises:

receiving, by the processor, user-defined boundaries.

14. The computer program product of claim 13, wherein the user-defined boundaries correspond to one or more of:

a geometrically-regular shape having boundaries defined by the user; and a geometrically-irregular shape having a perimeter defined by the user.

15. The computer program product of claim 11, wherein instructions to receive the selection of the second display region comprise:

instructions to receive, by the processor, an electronic input corresponding to a user's eye movement; and instructions to identify, by the processor, the second display region based on the user's eye movement.

16. The method of claim 1, wherein initiating the locking criteria further comprises:

receiving from the user via the electronic input source, an instruction to determine whether an advertising display region interferes with the third display region; and in response to determining the advertising display region interferes with the third display region, modifying the advertising display region such that only a portion of the advertising display region not interfering with the third display region is shown.

17. The method of claim 6, wherein the instructions to initiate the locking criteria further comprise:

instructions to receive from the user via the electronic input source, an instruction to determine whether an advertising display region interferes with the third display region; and in response to determining the advertising display region interferes with the third display region, instructions to modify the advertising display region such that only a portion of the advertising display region not interfering with the third display region is shown.

18. The method of claim 11, wherein the instructions to initiate by the processor the locking criteria further comprise:

instructions to receive, by the processor, from the user via the electronic input source, an instruction to determine whether an advertising display region interferes with the third display region; and in response to determining the advertising display region interferes with the third display region, instructions to modify, by the processor, the advertising display region such that only a portion of the advertising display region not interfering with the third display region is shown.

19. The method of claim 1, wherein the content of the at least one displayed data object in the third region remains locked as the webpage is displayed in multiple monitors.

20. The method of claim 6, wherein the content of the at least one displayed data object in the third region remains locked as the webpage is displayed in multiple monitors.

* * * * *